US006982417B2

(12) United States Patent
Baillargeon

(10) Patent No.: US 6,982,417 B2
(45) Date of Patent: Jan. 3, 2006

(54) METHOD AND APPARATUS FOR DETECTING LOW-MASS IONS

(75) Inventor: Michel J. Adrien Baillargeon, Bartlesville, OK (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 260 days.

(21) Appl. No.: 10/681,947

(22) Filed: Oct. 9, 2003

(65) Prior Publication Data

US 2005/0077466 A1 Apr. 14, 2005

(51) Int. Cl.
*B01D 59/44* (2006.01)

(52) U.S. Cl. ........................ 250/292; 250/281; 250/282; 250/293

(58) Field of Classification Search ................. 250/281, 250/282, 292, 293
See application file for complete search history.

(56) References Cited

U.S. PATENT DOCUMENTS

| | | | | | |
|---|---|---|---|---|---|
| 5,170,054 | A | * | 12/1992 | Franzen | 250/292 |
| 5,211,622 | A | * | 5/1993 | Liboff et al. | 600/9 |
| 5,291,017 | A | * | 3/1994 | Wang et al. | 250/292 |
| 5,420,425 | A | * | 5/1995 | Bier et al. | 250/292 |
| 5,436,445 | A | * | 7/1995 | Kelley et al. | 250/282 |
| 5,438,195 | A | * | 8/1995 | Franzen et al. | 250/292 |
| 5,448,061 | A | * | 9/1995 | Wells | 250/282 |
| 5,468,957 | A | * | 11/1995 | Franzen | 250/282 |
| 5,696,376 | A | * | 12/1997 | Doroshenko et al. | 250/292 |
| 5,703,358 | A | * | 12/1997 | Hoekman et al. | 250/282 |
| 5,714,755 | A | * | 2/1998 | Wells et al. | 250/281 |
| 6,483,109 | B1 | * | 11/2002 | Reinhold et al. | 250/292 |
| 6,512,226 | B1 | * | 1/2003 | Loboda et al. | 250/292 |
| 6,794,647 | B2 | * | 9/2004 | Farnsworth et al. | 250/293 |
| 6,833,544 | B1 | * | 12/2004 | Campbell et al. | 250/282 |

OTHER PUBLICATIONS

The Scientist and Engineer's Guide to Digital Signal Processing by Steven W. Smith, Ph.D., California Technical Publishing, Sep. 16, 2003, pp 1–3; Chapter 3—pp 35–66.

Siemens Energy & Automation Intranet Search on "Quantra" Sep. 3, 2003.

American Society for Mass Spectrometry: Education "What Is Spectrometry?" Dec. 1, 2001; downloaded sections.

* cited by examiner

*Primary Examiner*—John R. Lee
*Assistant Examiner*—David A. Vanore

(57) ABSTRACT

The present invention is a method and apparatus for generating a high frequency excitation signal for use in a mass spectrometer. Harmonics or aliases of a fundamental frequency contained in a signal from a digital-to-analog converter are used to excite ions in a Fourier transform ion cyclotron resonance mass spectrometer. The signal from the digital to analog converter may be filtered to remove the fundamental frequency or to remove unwanted harmonics or aliases.

34 Claims, 4 Drawing Sheets

METHOD AND APPARATUS FOR DETECTING LOW-MASS IONS

FIELD OF THE INVENTION

The present invention relates generally to the field of mass spectrometry, and more particularly, to a method of generating a high frequency excitation signal for use in a mass spectrometer such as a Fourier transform, ion cyclotron resonance mass spectrometer. The high frequency excitation signal is used in analyzing samples containing molecules or atoms having a very low mass-to-charge ratio, such as hydrogen and helium ions.

BACKGROUND OF THE INVENTION

Mass spectrometry is a powerful analytical tool used in the identification of unknown compounds and elements. The technique measures the mass-to-charge ratio (m/z) of individual ionized molecules. Because the charge of those ions is usually known (and is usually plus or minus z, the charge of one electron), the mass of the ion may be deduced, and the molecule may be identified.

The functional units of a modem mass spectrometer 100 are shown in FIG. 1. An inlet 110 provides a location for introduction of a sample. The inlet may be configured to accept a solid, a liquid or a gas. The inlet is equipped to permit introduction of the sample into a vacuum chamber 150 that is kept evacuated using vacuum pumps 118.

The sample passes into an ion source 112 that provides the charged molecular particles that are to be tested. In the case of a gaseous sample, ions are generated by bombarding the sample molecules with a beam of energetic electrons. Solid and liquids may first be vaporized by evaporation or sublimation, then subject to electron ionization. Less energetic ionization techniques have been developed based on chemical or desorption ionization. Those techniques are used where it is desirable to preserve a molecular structure of the sample.

The ions produced by the ion source 112 are directed into an analyzer 114 where the ions are sorted according to their mass-to-charge ratio. The sorted ions are then processed by a detector 116, where ion flux is converted into a proportional electrical current. That electrical current is recorded and analyzed by a data processing system 120 that contains analysis algorithms for producing mass spectra data outputs 122.

Several techniques have evolved for sorting and detecting ions in a modern mass spectrometer. The most widely used of those techniques include magnetic sector alyzers, quadrupole mass filters, quadrupole ion traps, Fourier transform ion cyclotron resonance spectrometers and time-of-flight mass analyzers. Of those techniques, a well-designed Fourier transform ion cyclotron resonance mass spectrometer (FT-ICR MS) provides extremely high resolution for relatively low cost. While the present invention is applicable to any of the above-mentioned spectrometer configurations, it will be described herein with reference to the FT-ICR MS.

Most mass spectrometers operate by altering the trajectory of an ion in a magnetic field. The new trajectory depends on properties related to the mass-to-charge ratio of the ion; i.e., at a given velocity, the trajectory of a more massive ion is altered less than that of a less massive ion. By subjecting ions of differing m/z to a fixed magnetic field, those ions may be separated for detection and analysis.

An analyzer/detector 200 of a typical FT-ICR MS, shown in partial section in FIG. 2, includes a group of plates

211–216 surrounding a roughly cubic cell 225. Ions entering the cell 225 along the path 250 are trapped electrostatically in a homogeneous magnetic field 220. The ions orbit around the field lines in orbits 230. Trapping plates 215, 216 keep the ions from spreading along the field lines.

The orbital motion 230 is induced by applying an RF pulse to the excitation plates 213, 214. Ions having a particular mass are excited by a particular resonant frequency, with less massive ions having a higher resonant frequency and more massive ions having a lower resonant frequency. In practice, a short RF pulse containing a specific group or range of frequencies is applied across the excitation plates 213, 214 to move all the ions sequentially.

As the ions are excited by their respective resonant frequencies, the orbit 230 of those ions enlarges, bringing them in proximity with the detection plates 211, 212. The ions induce a faint signal across the plates, which is received and analyzed by data system 120 (FIG. 1). Alternatively, the orbit of selected ions can be enlarged to a diameter that exceeds the dimensions of the cell by increasing the amplitude of the signal at the resonant frequency. This process, known as ejection, brings the selected ions outside the cell where they are eliminated by the vacuum pump. The ejection process is used to eliminate ions of chosen m/z to improve the detection limit of other ions, particularly when the concentration of the ejected ions is large compared to that of the ions of interest. For example, ejection may be used in detecting gasses in trace amounts with hydrogen.

The electronics 300 of an FT-ICR MS, shown as a simplified schematic in FIG. 3, includes detection electronics 310, excitation electronics 350 and a computer control 380. The excitation electronics 350 includes a digital signal processor (DSP) 352 controlling a digital to analog converter (DAC) 354. The output from the DAC 354 is filtered by filter 356 to remove unwanted signal components. The DSP 352, DAC 354 and filter 356 are used in existing FT-ICR MS equipment for the excitation and ejection of particles having a moderate to large molecular mass. The DAC 354 is controlled to generate a waveform containing the resonant frequencies used to excite or eject components that have masses corresponding to those resonant frequencies. That waveform is applied across the excitation plates 213, 214 of the FT-ICR MS cell 200.

Detection electronics 310 receive the resulting signal from the detection plates 211, 212. An analog-to-digital converter (ADC) 317 converts the analog signal to a digital signal, which is processed by the DSP 315. Both the excitation electronics 350 and the detection electronics 310 are controlled by a computer control 380. The computer control 380 executes instructions for initiating and operating the excitation and detection electronics 350, 310, as well as other components, and stores data for running particular routines involving those components. The computer control also stores and performs analysis of data received from the detection electronics 310.

In cases where low-mass elements, such as hydrogen and helium, must be analyzed, the required excitation frequencies are too high to be generated using the DAC 354 as used in the known art. That is because, under Nyquist sampling theory, the conversion rate of the DAC must be at least double the desired sampled output frequency to avoid aliasing. Prior art excitation electronics are designed to avoid aliasing; i.e., they are capable of sampling at a rate twice the highest specified output frequency. Commercially available DACs do not typically have a conversion rate sufficient to provide excitation signals having the resonant frequencies of light elements in a typical FT-ICR MS cell.

To circumvent the limited conversion rate of the DAC, it is known to switch control of the excitation plates 213, 214 using a selector 359 to a separate signal source such as a configurable oscillator 358. Such a configurable oscillator, when commercially available, is expensive and often does not have the resolution of the DSP/DAC components 352, 354 used in the analysis of higher-mass particles.

There is therefore presently a need to provide a method and apparatus for detecting low-mass particles using mass spectrometry. Particularly, there is a heed for a technique for generating an excitation frequency that is high enough to excite low-mass ions such as helium and hydrogen. The technique should preferably be implemented with a minimum of additional cost and should have high resolution. To the inventor's knowledge, there is currently no such technique available.

SUMMARY OF THE INVENTION

The present invention addresses the needs described above by providing a method for inducing ions of a predetermined mass-to-charge ratio to orbit at a resonant frequency between excitation plates. An excitation signal is generated, including a fundamental frequency and at least one secondary frequency greater than the fundamental frequency. The at least one secondary frequency includes the resonant frequency. The excitation signal is applied to the excitation plates.

The at least one secondary frequency may include a harmonic or an alias frequency of the fundamental frequency, in which case the resonant frequency is that harmonic or alias frequency. The method may also include the step of filtering the excitation frequency before applying it to the excitation plates. The filtering may substantially remove the fundamental frequency.

The excitation signal may be a signal having a substantially square waveform. In that case, the step of generating an excitation signal may further comprise setting the conversion rate of a digital-to-analog converter (DAC) to a value obtained by dividing the resonant frequency by an odd integer. The odd integer may, for example, be 3. The resonant frequency in this case may be a harmonic of the fundamental frequency.

The step of generating an excitation signal may alternatively include generating a sampled sinusoidal waveform having a sampling rate C and fundamental frequency f, where the resonant frequency is given by one of nC+f and (n+1)C−f, where n is a non-negative integer. That excitation signal may be passed through a band pass filter to remove unwanted frequencies. The resonant frequency in that case may be an alias of f.

The ions may be excited by inducing the ions to orbit between excitation plates, in which case the step of applying the excitation signal to the ions includes applying the excitation signal to the excitation plates. The excitation signal may eject a first portion of the ions from the cell, permitting detection of a second portion of the ions.

In another embodiment of the invention, an apparatus is provided for inducing ions of a predetermined mass-to-charge ratio to orbit at a resonant frequency. The apparatus includes a digital signal processor (DSP) configured to output a digital connected to the DSP for converting the digital signal to an analog excitation signal including the fundamental frequency and at least one secondary frequency greater than the fundamental frequency, the at least one secondary frequency including the resonant frequency. The apparatus also comprises excitation plates connected to the DAC for applying the excitation signal to the ions.

The at least one secondary frequency may include a harmonic or an alias frequency of the fundamental frequency, in which case the resonant frequency is that harmonic or alias frequency. A filter may be included in the apparatus for substantially removing at least one frequency from the excitation signal before it is applied to the plates. The filter may be a band pass filter that passes frequencies at and around the resonant frequency. The filter may remove the fundamental frequency from the excitation signal.

The DSP may be configured to output a square wave to the DAC. In that case, the DAC may be further configured to have a conversion rate obtained by dividing the resonant frequency by an odd integer.

The DAC may be configured to generate a sampled sinusoidal waveform having a sampling rate C and frequency f wherein the resonant frequency is given by one of nC+f and (n+1)C−f, where n is a non-negative integer. The excitation signal may comprise a plurality of sampled sinusoidal waveforms resulting in a plurality of secondary frequencies corresponding to a plurality of resonant frequencies of ions of a plurality of predetermined mass-to-charge ratios.

The excitation signal may induces the ions to orbit between the excitation plates, or may alternatively induce the ions to orbit outside the excitation plates.

Another embodiment of the invention is a computer-readable medium storing instructions that, when executed by one or more processors, cause the one or more processors to perform certain activities. Those activities include transmitting instructions to a digital signal processor to generate a digital output including a signal at a fundamental frequency; transmitting instructions to cause a digital-to-analog converter to convert the digital output to an analog excitation signal including the fundamental frequency and at least one secondary frequency greater than the fundamental frequency, and to output the excitation signal to excitation plates of a mass spectrometer; and receiving and interpreting a detection signal from detection plates of the mass spectrometer, the detection signal generated by ions induced by the excitation plates to orbit at a resonant frequency equal to one of the secondary frequencies.

DESCRIPTION OF THE INVENTION

Figure 1:
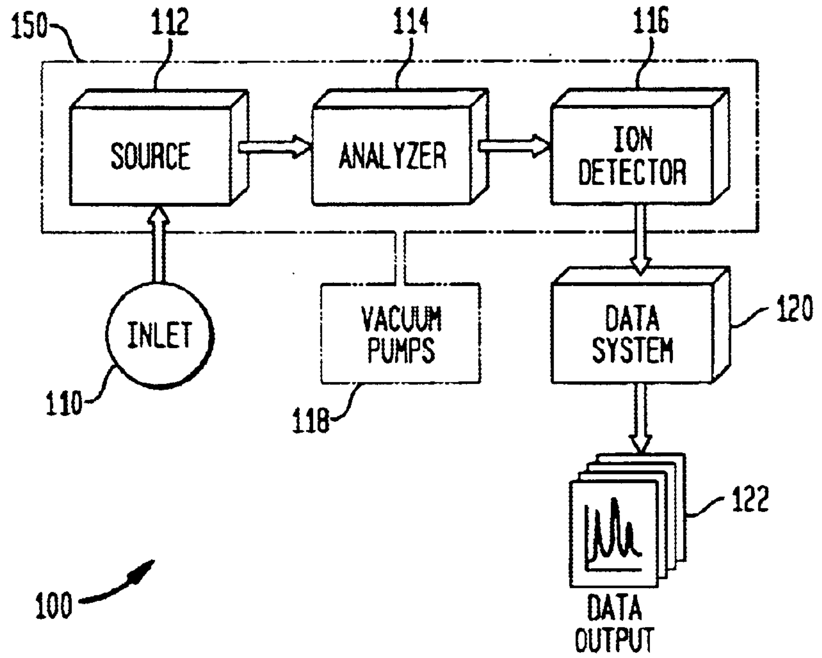
FIG. 1 (PRIOR ART)
FIG. 1 is a block diagram showing the functional elements of a mass spectrometer .
Figure 2:
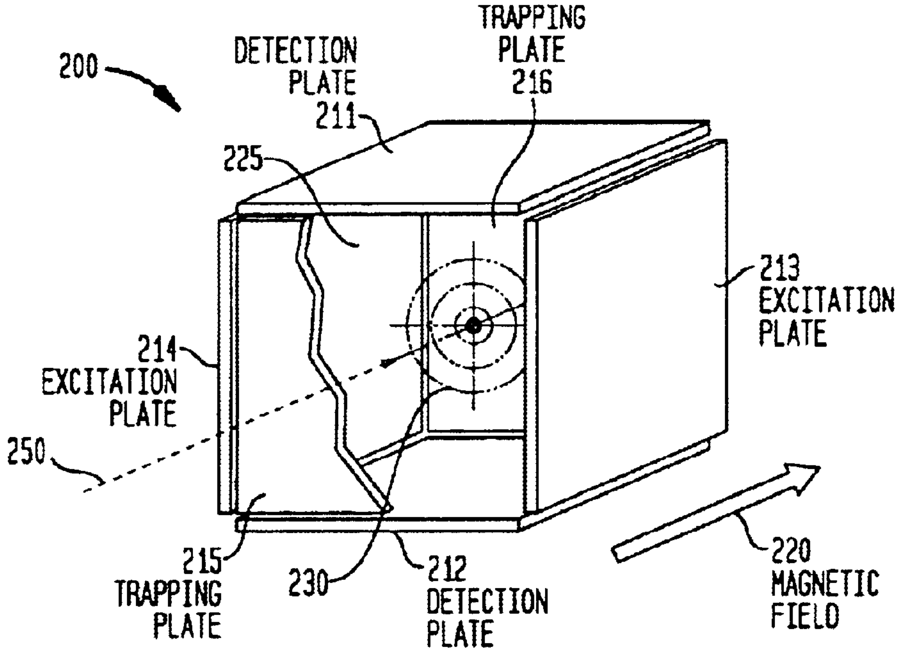
FIG. 2 (PRIOR ART)
FIG. 2 is a schematic diagram of the analyzer and ion detector cell elements of an FT-ICR MS.

The method and apparatus of the present invention provide a high resolution, high-frequency excitation signal for a FT-ICR MS without the expense of a separate, additional configurable oscillator. Instead, the inventor has taken advantage of secondary frequencies that are naturally present in an output of a DAC, and has utilized those frequencies, with or without filtering as necessary, as excitation signals in a FT-ICM MS cell. The term "secondary frequency," as used herein, means a frequency other than the fundamental or base frequency that a DAC has been programmed to output. Two examples of secondary frequencies that are used herein are harmonic frequencies and alias frequencies, although the term "secondary frequency" is by no means limited to those examples.

In general, the method of the invention utilizes an output of a DAC that includes both a fundamental frequency and one or more secondary frequencies. The secondary frequencies are contained in the output signal of the DAC as a result of various factors. Harmonics, for example, may be generated by configuring the DAC to output a non-sinusoidal waveform. Alias frequencies are produced in the wave construction process of a DAC, and are normally removed by a low-pass filter. The frequencies of those secondary signals are predictable. Significantly, unlike the fundamental output frequency, the secondary frequencies are not directly limited by the Nyquist sampling theorem; i.e. those frequencies are not limited to half the maximum conversion rate of the DAC.

The amplitude of the secondary frequencies is proportional to the amplitude of the fundamental frequency. With higher harmonics or aliases, it is significantly less than that of the fundamental frequency. A modern DAC, however, has relatively a low signal-to-noise ratio, and the secondary frequencies may be amplified to the necessary level without introducing excessive noise. Further, as described below, the signal may be filtered to remove known unwanted peaks.

A computer control such as computer control 380 (FIG. 3) controls the excitation electronics including the DAC, as well as the detection electronics. That computer control contains one or more processors for executing stored instructions for performing the methods of the invention as described herein. The instructions are stored on a computer-readable medium.

The computer readable medium comprises any medium that participates in submitting instructions to a processor. For example, the instructions may be temporarily stored in a volatile, non-removeable random-access memory (RAM) within the computer control, and transferred from the RAM to a processor for execution. Further, the instructions may be stored in non-volatile memory available for reading into RAM or for direct execution by the processor. Examples of non-volatile memory include removable or non-removable read-only memory (ROM), flash memory cards (flash RAM), magnetic media such as fixed disks, floppy disks and magnetic tape, and optical media such as optical disks using CD and DVD formats.

Two related embodiments of the method and apparatus of the invention are described herein. Those embodiments are intended to be illustrative only, and are in no way intended to limit the scope of the claims.

Figure 4:
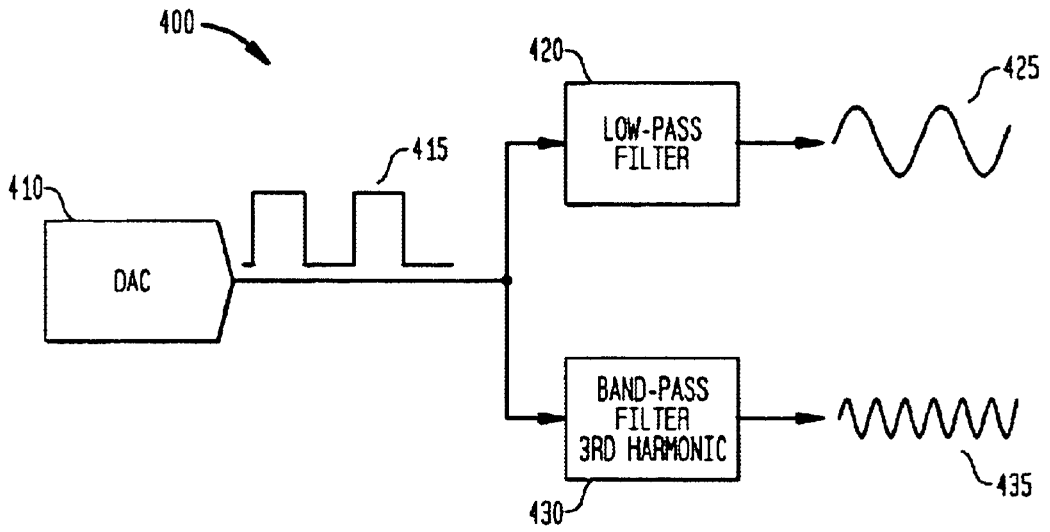
FIG. 4 is a schematic diagram of a DAC and filters showing wave outputs according to one embodiment of the invention.

A first embodiment is illustrated by the excitation electronics 400 shown in FIG. 4. To produce a resonant frequency of a sample component, the conversion rate of the DAC 410 is set to a value generated by dividing the desired frequency by an odd integer ($1/3^{rd}$, $1/5^{th}$, . . . of the desired frequency), and the output value is alternated between two selected levels. The "desired frequency" or "resonant frequency," as used in the present application, refers to a frequency at which a specific ion is excited or resonates within a mass spectrometer cell for detection. In a given cell under constant conditions, that frequency depends upon the mass-to-charge ratio of the ion. Before use, a given cell must be individually calibrated to take into consideration its physical dimensions, the strength and geometry of the field magnets and many other variables.

The DAC in the presently described embodiment generates a waveform 415 that is similar to a square wave with amplitude controlled by the difference between the two levels selected. That waveform is rich in odd harmonics. There is therefore a sizeable portion of the signal energy in the third harmonic, somewhat less energy in the fifth harmonic, and so on.

One or more filters may be used to separate the signal into multiple frequency components. For example, a low-pass filter 420 may be used to remove high frequency harmonics if those frequencies correspond to the resonant frequencies of other ions that are not of interest in the sample. A wave such as wave 425 is produced. A band-pass filter 430 may also be used to produce a signal containing only a selected one of the harmonics, such as the third harmonic 435. Alternatively, the filtering may be completely eliminated if the additional frequencies generated are not conflicting with the resonant frequencies of any other ions in the measured compound.

Figure 3:
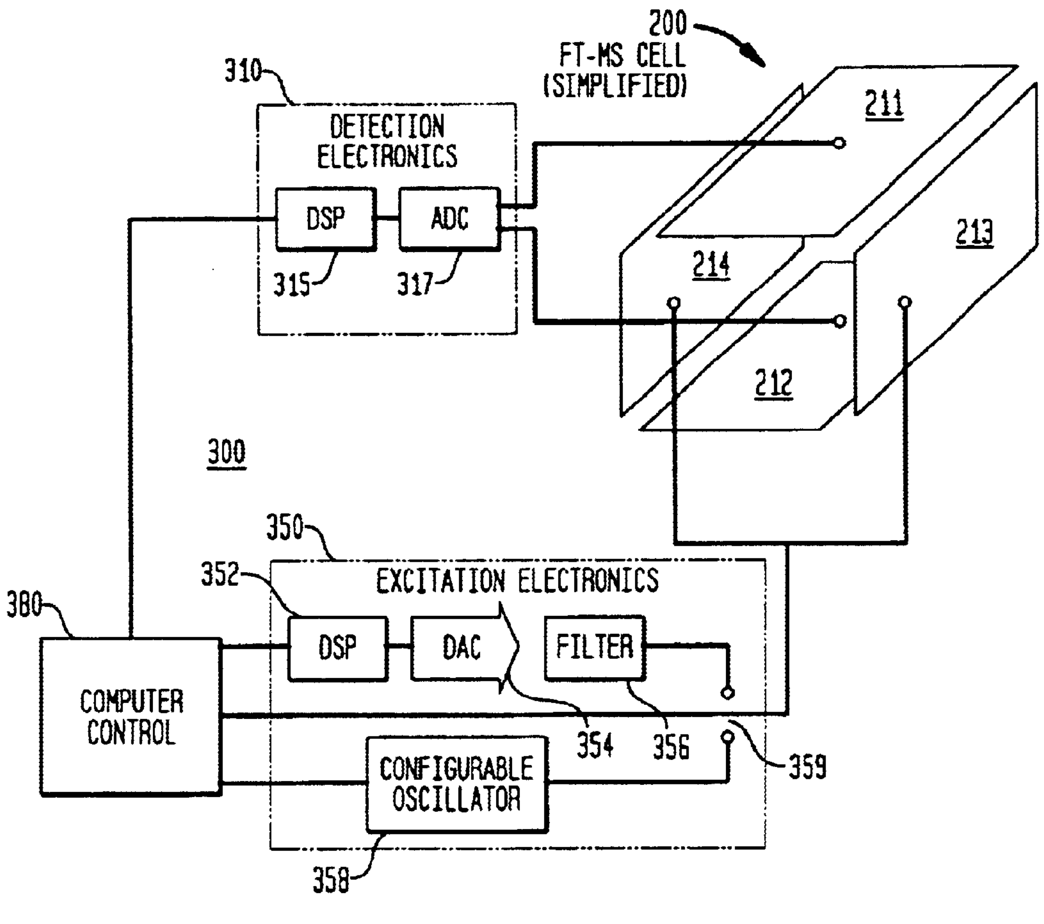
FIG. 3 (PRIOR ART)
FIG. 3 is a schematic diagram of the analyzer and ion detector electronics of an FT-ICR MS.

The signal containing the desired frequency is then applied across the excitation plates 213, 214 as is known in the art (FIG. 3). If ions having resonance at the desired frequency are present in the MS cell, they are excited by the signal. The ions are then either detected as they generate a voltage across detection plates 211, 212, or are ejected from the cell, depending on the design of the particular experiment.

Figure 5:
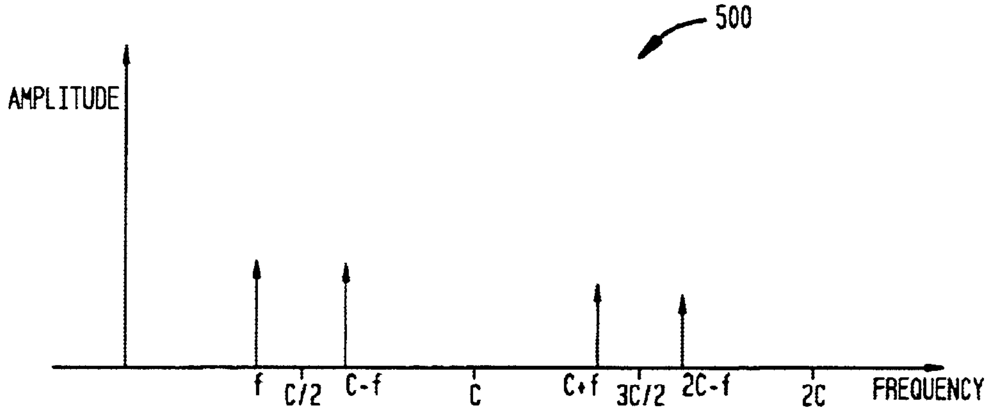
FIG. 5 is a schematic diagram showing a frequency spectrum of a waveform output of a DAC according to one embodiment of the invention.

Another embodiment of the invention utilizes a sine wave generated by the DAC and having a frequency spectrum as schematically shown in FIG. 5. With a conversion rate "C", the DSP is configured to control the DAC to generate a discrete sinusoidal waveform having a fundamental frequency "f". As is well known in the digital signal processing art, the generated signal will contain additional energy at alias frequencies above f. In the prior art configuration described above, the DAC output is filtered by a low-pass "reconstruction" filter, with a cut-off frequency that does not exceed "C/2", the Nyquist criterion. The resulting filtered waveform is then a sine Wave at the fundamental frequency "f", which is used as the excitation frequency.

If, however, no filtering is used, the resulting waveform is a combination of alias frequencies at;

$$fa(n)=nC+f$$

and $$fb(n)=(n+1)C-f$$

where n=0, 1, 2, 3, . . . . A graphical representation of the spectral content of the resulting waveform is shown in FIG. 5, for n=0 and n=1.

To generate an excitation signal containing a desired frequency designed for exciting a particular ion, a fundamental frequency f is selected so that one of the alias frequencies according to the formulae above coincides with the desired frequency.

In one experiment conducted according to the presently described embodiment of the invention, it was desired to detect hydrogen ions H2+ having a positive charge z and a mass of 2.0158 amu. A Siemens Quantra FT-ICR MS was used having a nominal 0.95 Telsa field magnet under 40° C. conditions. The maximum conversion rate of the DAC was 5 MHz (5 million conversions per second).

Under those conditions, the ion cyclotron frequency for H2+ is 7.275 MHz. As can be seen, a prior art DSP-DAC configuration could not be used to excite the H2+ ions because the maximum available excitation frequency is one-half the maximum conversion rate, or 2.5 MHz. Using the method of the present embodiment, a discrete signal having a fundamental frequency of 2.275 MHz was used. The resulting signal output from the DAC contained energy at the fundamental frequency, plus additional energy at the alias frequencies of 2.725 MHz, 7.275 MHz, 7.725 MHz, . . . . Those frequencies were predicted as described above. The resulting signal was used to detect hydrogen ions at the resonant frequency of 7.275 MHz. No filtering was used.

In another experiment using the same conditions and equipment, a helium ion having a mass of 4.0026 amu, a charge of +z and an ion cyclotron resonant frequency of 3.662 MHz. Again, the DAC was not capable of producing an excitation signal with sufficiently high frequency, and prior art methods would necessitate the use of an auxiliary configurable oscillator. Using the presently described embodiment of the invention, the DAC was configured to generate a signal containing a sampled sine wave with a fundamental frequency of 1.338 MHz and energy at alias frequencies of 3.662 MHz, 6.338 MHz, 8.662 MHz, . . . . The He+ ions were detected at their resonant frequency of 3.662 MHz.

Figure 6:
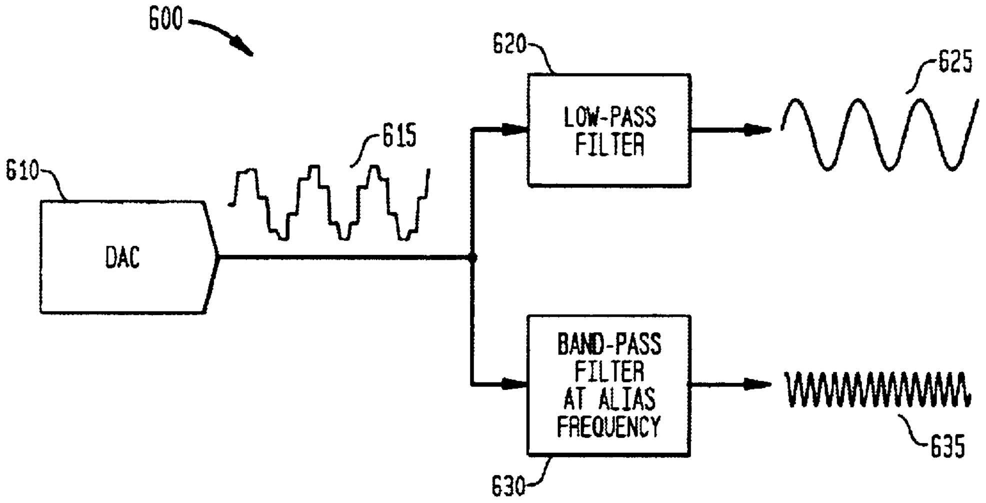
FIG. 6 is a schematic diagram of a DAC and filters showing wave outputs according to one embodiment of the invention.

Using filters, the signal containing the fundamental frequency and alias frequencies may be separated into multiple frequency components. For example, the DAC 610 of FIG. 6 produces a sine wave 615 containing a significant portion of its energy in alias frequencies. A DAC configured to eliminate alias frequencies as is known in the art utilizes a reconstruction low pass filter 620 as described above to filter out alias frequencies, resulting in a signal 625 comprising largely the fundamental frequency. To utilize the presently described embodiment of the invention, a band-pass filter 630 may be used to create a signal that comprises primarily an alias frequency of interest such as signal 635. Alternatively, as in the examples described above in connection with the detection of hydrogen and helium, filtering may be excluded from the procedure if the frequencies present in the excitation signal do not interfere with operation of the instrument.

The technique of the present invention may be extended to generate any combination of frequencies by controlling the waveform generated by the DAC, so that it contains more than one fundamental frequency, and the corresponding alias frequencies. The rejection of unwanted frequencies can be accomplished by a band-pass filter that covers the frequency range of interest. Alternatively, the filtering can be totally eliminated if the fundamental and additional frequencies generated are not interfering with any masses in the measured compound.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the Method of generating excitation signals is described in combination with the use of a FT-ICR mass spectrometer, that technique may be used with other mass spectrometers, or other instrumentation requiring excitation signals, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for exciting ions of a predetermined mass-to-charge ratio at a resonant frequency, the method comprising the steps of:

generating an excitation signal including a fundamental frequency and at least one secondary frequency greater than the fundamental frequency, the at least one secondary frequency including the resonant frequency; and applying the excitation signal to the ions.

2. The method of claim 1, wherein the at least one secondary frequency includes a harmonic frequency of the fundamental frequency and the resonant frequency is the harmonic frequency.

3. The method of claim 1, wherein the at least one secondary frequency includes an alias frequency of the fundamental frequency and the resonant frequency is the alias frequency.

4. The method of claim 1, further comprising the step of filtering the excitation frequency before applying it to the excitation plates.

5. The method of claim 1, further comprising the step of filtering the excitation signal to substantially remove the fundamental frequency.

6. The method of claim 1, wherein the excitation signal comprises a signal having a substantially square waveform.

7. The method of claim 6, wherein the step of generating an excitation signal further comprises setting a conversion rate of a digital-to-analog converter to a value obtained by dividing the resonant frequency by an odd integer.

8. The method of claim 7, wherein the odd integer is 3.

9. The method of claim 7, wherein the at least one secondary frequency includes a harmonic frequency of the fundamental frequency and the resonant frequency is the harmonic frequency.

10. The method of claim 1, wherein the step of generating an excitation signal further comprises generating a sampled sinusoidal waveform having a sampling rate C and fundamental frequency f wherein the resonant frequency is given by one of $nC+f$ and $(n+1)C-f$, where n is a non-negative integer.

11. The method of claim 10, further comprising the step of passing the excitation signal through a band pass filter to remove unwanted frequencies.

12. The method of claim 10, wherein the at least one secondary frequency includes an alias frequency of the fundamental frequency and the resonant frequency is the alias frequency.

13. The method of claim 1, wherein the ions are excited by inducing the ions to orbit between excitation plates, and the step of applying the excitation signal to the ions includes applying the excitation signal to the excitation plates.

14. The method of claim 1, wherein the excitation signal ejects a first portion of the ions from the cell, permitting detection of a second portion of the ions.

15. An apparatus for inducing ions of a predetermined mass-to-charge ratio to orbit at a resonant frequency, comprising:

a digital signal processor (DSP) configured to output a digital signal comprising a fundamental frequency;

a digital-to-analog converter (DAC) connected to the DSP for converting the digital signal to an analog excitation signal including the fundamental frequency and at least one secondary frequency greater than the fundamental frequency, the at least one secondary frequency including the resonant frequency; and excitation plates connected to the DAC for applying the excitation signal to the ions.

16. The apparatus of claim 15, wherein the at least one secondary frequency includes a harmonic frequency of the fundamental frequency and the resonant frequency is the harmonic frequency.

17. The apparatus of claim 15, wherein the at least one secondary frequency includes an alias frequency of the fundamental frequency and the resonant frequency is the alias frequency.

18. The apparatus of claim 5, further comprising a filter for substantially removing at least one frequency from the excitation signal before it is applied to the plates.

19. The apparatus of claim 18, wherein the filter is a band pass filter that passes frequencies at and around the resonant frequency.

20. The apparatus of claim 18, wherein the filter removes the fundamental frequency from the excitation signal.

21. The apparatus of claim 15, wherein the DSP is further configured to output a square wave to the DAC.

22. The apparatus of claim 21, wherein the DAC is further configured to have a conversion rate obtained by dividing the resonant frequency by an odd integer.

23. The apparatus of claim 15, wherein the DAC is configured to generate a sampled sinusoidal waveform having a sampling rate C and frequency f wherein the resonant frequency is given by one of nC+f and (n+1)C−f, where n is a nonnegative integer.

24. The apparatus of claim 15, wherein the excitation signal contains a plurality of secondary frequencies corresponding to a plurality of resonant frequencies of ions of a plurality of predetermined mass-to-charge ratios.

25. The apparatus of claim 15, wherein the excitation signal induces the ions to orbit between the excitation plates.

26. The apparatus of claim 15, wherein the excitation signal induces the ions to orbit outside the excitation plates.

27. A computer-readable medium storing instructions that, when executed by one or more processors, cause the one or more processors to perform activities comprising:

transmitting instructions to a digital signal processor to generate a digital output including a signal at a fundamental frequency;

transmitting instructions to cause a digital-to-analog converter to convert the digital output to an analog excitation signal including the fundamental frequency and at least one secondary frequency greater than the fundamental frequency, and to output the excitation signal to excitation plates of a mass spectrometer; and receiving and interpreting a detection signal from detection plates of the mass spectrometer, the detection signal generated by ions induced by the excitation plates to orbit at a resonant frequency equal to one of the secondary frequencies.

28. The computer readable medium of claim 27, wherein the at least one secondary frequency includes a harmonic frequency of the fundamental frequency and the resonant frequency is the harmonic frequency.

29. The computer readable medium of claim 27, wherein the at least one secondary frequency includes an alias frequency of the fundamental frequency and the resonant frequency is the alias frequency.

30. The computer readable medium of claim 27, wherein the analog excitation signal is a sampled sinusoidal waveform having a sampling rate C and frequency f wherein the resonant frequency is given by one of nC+f and (n+1)C−f, where n is a non-negative integer.

31. The computer readable medium of claim 27, wherein the analog excitation signal contains a plurality of secondary frequencies, and the detection signal is generated by ions induced to orbit at a plurality resonant frequencies equal to a plurality of the secondary frequencies.

32. The computer readable medium of claim 27, wherein the excitation signal is filtered between the digital-to-analog converter and the excitation plates.

33. The computer readable medium of claim 32, wherein the filter is a band pass filter that passes the resonant frequency.

34. The computer readable medium of claim 32, wherein the filter removes the fundamental frequency.

* * * * *